US012645362B2

(12) United States Patent　　　　　(10) Patent No.:　US 12,645,362 B2

ElTantawy et al.　　　　　　　　　　(45) Date of Patent:　　Jun. 2, 2026

(54) SYSTEMS AND METHODS FOR PROVIDING EXTENDED MEMORY ACCESS IN A PARALLEL PROCESSOR

(71) Applicants: ATI TECHNOLOGIES ULC, Markham (CA); ADVANCED MICRO DEVICES, INC., Santa Clara, CA (US)

(72) Inventors: Ahmed Mohammed ElShafiey Mohammed ElTantawy, Woodbridge (CA); Brian Emberling, Santa Clara, CA (US); Stanislav Mekhanoshin, Salinas, CA (US)

(73) Assignees: ATI TECHNOLOGIES ULC, Markham (CA); ADVANCED MICRO DEVICES, INC., Santa Clara, CA (US)

( * ) Notice:　Subject to any disclaimer, the term of this patent is extended or adjusted under 35 U.S.C. 154(b) by 0 days.

(21) Appl. No.: 18/895,614

(22) Filed:　Sep. 25, 2024

(65)　　　　Prior Publication Data

US 2026/0086718 A1　　Mar. 26, 2026

(51) Int. Cl.
*G06F 3/06*　　　　　(2006.01)
(52) U.S. Cl.
CPC ..........　*G06F 3/0611* (2013.01); *G06F 3/0659* (2013.01); *G06F 3/0673* (2013.01)
(58) Field of Classification Search
CPC ..... G06F 3/0611; G06F 3/0659; G06F 3/0673
See application file for complete search history.

(56)　　　　References Cited

U.S. PATENT DOCUMENTS

| | | | |
|---|---|---|---|
| 5,790,821 | A | 8/1998 | Pfum |
| 6,167,505 | A | 12/2000 | Kubota et al. |
| 6,499,099 | B1 | 12/2002 | Cho |
| 6,651,160 | B1 | 11/2003 | Hays |
| 6,687,806 | B1 | 2/2004 | McGrath |
| 6,732,257 | B1 | 5/2004 | Sheaffer |
| 7,287,145 | B1 | 10/2007 | Simeral et al. |
| 7,676,653 | B2 | 3/2010 | May |
| 7,793,081 | B2 | 9/2010 | Gschwind et al. |

(Continued)

FOREIGN PATENT DOCUMENTS

EP　　　　0510635　B1　　6/1999

OTHER PUBLICATIONS

Advanced Micro Devices, Inc., "AMD Instinct MI300' Instruction Set Architecture, Reference Guide" Advanced Micro Devices, Inc., 2023, 553 pages.

(Continued)

*Primary Examiner* — Larry T Mackall

(57)　　　　ABSTRACT

A parallel processor assigns data for use by one or more tasks to a shared memory or memories associated with a plurality of compute units. A scheduler or other controller within or otherwise associated with the parallel processor assigns threads or groups of threads, which utilize the assigned data, to compute units as appropriate. Compute units utilize two sets of instructions, one specifying upper bits and one specifying lower bits of a memory address, to specify memory addresses that are larger than a number of bits an individual instruction can specify in a memory address field. Mode setting commands determine when and how lower bits in a memory address field of an instruction will be combined with upper bits in a previous instruction, e.g., through concatenation.

19 Claims, 4 Drawing Sheets

(56)          References Cited

U.S. PATENT DOCUMENTS

| | | | |
|---|---|---|---|
| 8,166,281 | B2 | 4/2012 | Gschwind et al. |
| 8,719,464 | B2 | 5/2014 | Kegel et al. |
| 8,893,079 | B2 | 11/2014 | Gschwind et al. |
| 9,311,093 | B2 | 4/2016 | Gschwind et al. |
| 10,019,365 | B2 | 7/2018 | Breternitz |
| 10,037,267 | B2 | 7/2018 | Breslow et al. |
| 10,600,142 | B2 | 3/2020 | Ceylan et al. |
| 10,915,323 | B2 | 2/2021 | Kwon et al. |
| 10,929,944 | B2 | 2/2021 | Chen et al. |
| 2004/0181626 | A1 | 9/2004 | Pickett |
| 2012/0284449 | A1 | 11/2012 | Tung et al. |
| 2015/0019845 | A1 | 1/2015 | Anderson et al. |
| 2016/0055033 | A1* | 2/2016 | Hechtman ............ G06F 9/5088 |
| | | | 718/105 |
| 2019/0034151 | A1 | 1/2019 | Dutu et al. |
| 2019/0205047 | A1* | 7/2019 | Hsieh ................... G06F 3/0622 |
| 2020/0133850 | A1 | 4/2020 | Chong et al. |
| 2020/0202180 | A1* | 6/2020 | Zhang ................. G06N 3/0464 |
| 2022/0091980 | A1* | 3/2022 | Kayiran ............. G06F 13/1668 |

OTHER PUBLICATIONS

Wikipedia, "x86 Memory Segmentation", Wikipedia.org, <https://en.wikipedia.org/wiki/X86_memory_segmentation>, Accessed Aug. 5, 2024, 8 pages.
International Search Report and Written Opinion mailed Jan. 19, 2026 for International Application No. PCT/US2025/047140, 9 pages.

* cited by examiner

405

400

SPECIFY A FIRST MEMORY
ADDRESS FOR A MEMORY OF
A FIRST COMPUTE UNIT BY
CONCATENATING FIRST BITS
RECEIVED IN A FIRST
INSTRUCTION WITH SECOND
BITS RECEIVED IN A SECOND
INSTRUCTION

410

ACCESS THE MEMORY
ASSOCIATED OF THE FIRST
COMPUTE UNIT WITH A
SECOND COMPUTE UNIT
USING THE FIRST MEMORY
ADDRESS

SYSTEMS AND METHODS FOR PROVIDING EXTENDED MEMORY ACCESS IN A PARALLEL PROCESSOR

BACKGROUND

Parallel processors such as accelerator processors and graphics processing units (GPUs) conventionally implement graphics processing pipelines that concurrently process copies of commands that are retrieved from a command buffer. GPUs and other multithreaded processing units typically implement multiple processing elements (which may include processor cores, compute units, chiplets, or workgroup processors) that execute different programs or concurrently execute multiple instances of a single program on multiple data sets as a single "wave," i.e., a group of threads running concurrently on a GPU. A hierarchical execution model is typically used to match the hierarchy implemented in hardware.

The execution model defines a kernel of instructions that are executed by one or more waves (also referred to as wavefronts, which may include one or more threads, streams, tasks, or work items). The graphics pipeline in a conventional GPU includes one or more shader engines that execute computer programs typically referred to as "shaders" using resources of the graphics pipeline such as compute units, memory, and caches. GPUs are traditionally used for graphical calculations, as implied by their name; however, in modern computing, shaders are often utilized as "compute shaders," which function as general-purpose software that is able to perform work separately from a graphics processing pipeline. As GPU usage and machine learning applications have expanded over time, there is a necessity to improve the functionality and performance of GPUs and related accelerated processors.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
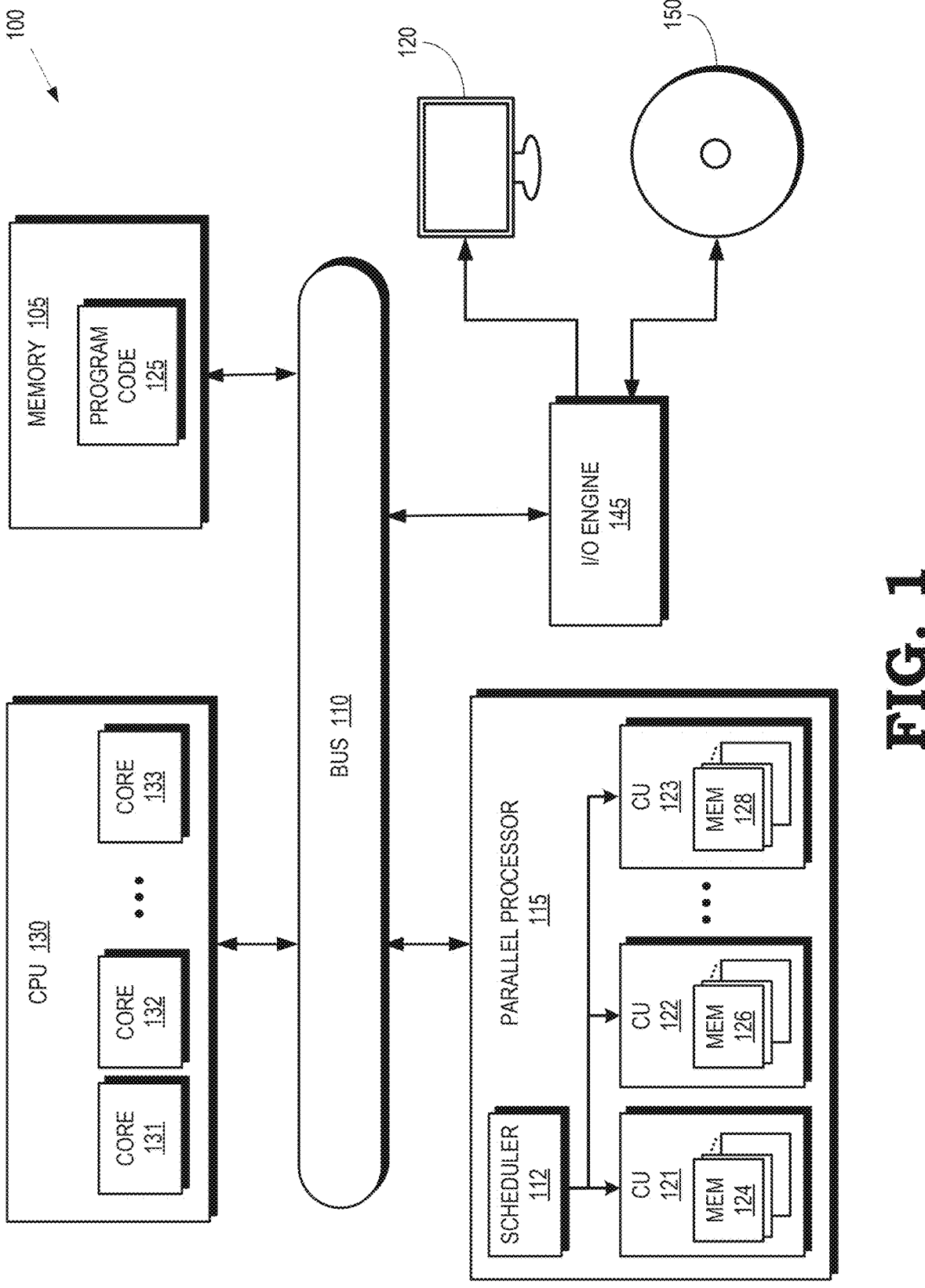
FIG. 1 is a block diagram of a processing system providing extended memory access in a parallel processor according to some implementations.

A parallel processor such as an accelerated processing device or graphics processing unit (GPU) typically includes a plurality of "shader engines," where each shader engine includes a respective quantity of compute units, and a command processor coupled to the plurality of shader engines. Based on one or more commands received for execution, a plurality of workgroups or tasks (e.g., processing threads or collections of threads corresponding to one or more programs) is generated for assignment to the plurality of shader engines for processing. The command processor receives one or more commands for execution and generates the plurality of workgroups based on the one or more commands. Assigning each workgroup to a respective shader engine may include dynamically assigning each workgroup to a respective shader engine via an interface such as a shader program interface, which acts as a scheduler, associated with the respective shader engine. However, individual compute units are often only able to access a subset of high-bandwidth, low-latency memory, such as a memory directly associated and collocated with each of the respective compute units.

As GPU usage for executing compute shaders, machine learning applications, and other general-purpose applications has expanded over time, the need has arisen to provide processors with the flexibility to execute tasks related to a graphics processing pipeline, machine learning, or other advanced computing applications in an efficient manner. To this end, processors implemented in accordance with the teachings of the present disclosure are provided with the ability to access extended memory address spaces in an efficient manner such that individual compute units are able to address and utilize memories associated with other compute units or memories external to the parallel processors in which they reside. In this way, rather than having to assign a plurality of tasks to a plurality of compute units and store separate associated data in memories associated with each of the respective compute units, a single compute unit or small group of compute units can be assigned tasks that are able to access a full range of memory, such as memories associated with a subset of or all other compute units in a processor without exceeding a memory address field bit size limit of an individual instruction, enabling more efficient processing and reducing the burden of determining how to assign data to individual compute units.

FIGS. 1-4 illustrate systems and techniques for providing extended memory access in a parallel processor. As described in detail hereinbelow, a parallel processor assigns data for use by one or more tasks to a shared memory or memories associated with a plurality of compute units. A scheduler or other controller within or otherwise associated with the parallel processor assigns threads or groups of threads, which utilize the assigned data, to compute units as appropriate. Then, utilizing two sets of instructions, one specifying upper bits, or "offset" bits, and one specifying lower bits of a memory address, compute units are able to specify memory addresses that are larger than a number of bits an individual instruction can specify in a memory address field. In some implementations, the instructions include mode setting commands that determine when and how lower bits in a memory address field of an instruction will be combined with upper bits in a previous instruction, enabling threads to update their state to control whether operands will be affected by offset bits specified in a previous instruction. In some implementations, multiple subsets of bits in a first instruction provide upper bits for multiple memory address fields in one or more subsequent instructions. The teachings herein enable compute units to more efficiently execute tasks with lower latency and fewer limitations.

FIG. 1 is a block diagram of a processing system 100 providing extended memory access in a parallel processor according to some implementations. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is sometimes referred to as an external memory as it is implemented external to the processing units implemented in the processing system 100. The processing system 100 also includes a bus 110 to support communication between entities implemented in the processing system 100, such as the memory 105. Some implementations of the processing system 100 include other buses, bridges, switches, routers, and the like, which are not shown in FIG. 1 in the interest of clarity.

The techniques described herein are, in different implementations, employed at any of a variety of parallel processors (e.g., vector processors, GPUs, general-purpose GPUs (GPGPUs), non-scalar processors, highly parallel processors, artificial intelligence (AI) processors, inference engines, machine learning processors, other multithreaded processing units, and the like). FIG. 1 illustrates an example of a specialized processor, which is implemented in the illustrated example as parallel processor 115, in accordance with some implementations. In some implementations, the parallel processor 115 renders images for presentation on a display 120. For example, the parallel processor 115 renders objects to produce values of pixels that are provided to the display 120, which uses the pixel values to display an image that represents the rendered objects. However, in some implementations, the parallel processor 115 is capable of executing software not directly involved in any graphics processing pipeline, such as machine learning applications and other advanced computing applications.

In order to provide the parallel processor 115 with the flexibility to execute tasks related to a graphics processing pipeline, machine learning, or other advanced computing applications in an efficient manner, the parallel processor 115 includes a plurality of compute units, such as compute units 121, 122, and 123, which are configured to process tasks such as threads or waves. The compute units 121, 122, and 123 are able to execute instructions separately or in parallel and, in some implementations, each have an associated and/or collocated memory, such as memories 124, 126, and 128, that the associated compute unit can access with extremely low latency (e.g., compute unit 121 and associated memory 124). In some implementations, the memories 124, 126, and 128 include one or more registers or groups of registers. By providing the parallel processor 115 with a plurality of compute units 121, 122, and 123, the parallel processor 115 is configurable to process a plurality of threads or waves, while latency and energy requirements for data transfer between the compute units 121, 122, and 123 is minimized. In some implementations, the compute units 121, 122, and 123 are used to implement shaders, such as geometry shaders, pixel shaders, and the like. Generally, the compute units 121, 122, and 123 are a logical grouping of processing hardware, which in some implementations includes, e.g., one or more processing chiplets, processor cores, and/or caches. The number of compute units 121, 122, and 123 and memories 124, 126, and 128 implemented in the parallel processor 115 is a matter of design choice and some implementations of the parallel processor 115 include more or fewer compute units and/or memories than are shown in FIG. 1.

As shown in FIG. 1, the parallel processor 115 further includes a scheduler 112, which is implemented as any cooperating collection of hardware, software, or a combination thereof that performs functions and computations associated with assigning threads, workgroups, waves, or other tasks, such as compute shader threads, to one or more of the compute units 121, 122, and 123. In some implementations, one or more of the compute units 121, 122, and 123 are able to be selectively addressed or controlled independently from one another or addressed or controlled in groups of two or more such that the parallel processor 115, the scheduler 112, and/or a user is able to control which compute units 121, 122, and 123 perform specific tasks or to distribute tasks across a number of compute units 121, 122, and 123. In some implementations, the parallel processor 115 is used for general purpose computing. The parallel processor 115 executes instructions such as program code 125 stored in the memory 105 and the parallel processor 115 stores information in the memory 105 such as the results of the executed instructions.

As described further hereinbelow, in order to provide extended memory access in a parallel processor, the parallel processor 115 is configured to assign data associated with tasks to memories, e.g., the memories 124, 126, 128, associated with, e.g., in close proximity to and/or sharing a chiplet with a respective one of, the plurality of compute units 121, 122, and 123. In some implementations, the parallel processor 115 transfers program code and/or data from the memory 105 to one or more of the memories 124, 126, and 128 associated with the compute units 121, 122, 123. Although the parallel processor 115 or a related controller will typically assign data to the memories 124, 126, 128 and the scheduler 112 will typically assign tasks to the compute units 121, 122, and 123, in some implementations, a user or program manually assigns tasks to the compute units 121, 122, and 123 and data to the memories 124, 126, 128, either directly or via the scheduler 112, as desired for a particular scenario in which a user or a program utilizes the parallel processor 115 in a particular configuration.

In some implementations, the processing system 100 also includes a CPU 130 that is connected to the bus 110 and therefore communicates with the parallel processor 115 and the memory 105 via the bus 110. The CPU 130 implements a plurality of processor cores 131, 132, 133 (collectively referred to herein as "processor cores 131-133") that execute instructions concurrently or in parallel. The number of processor cores 131-133 implemented in the CPU 130 is a matter of design choice and some implementations include more or fewer processor cores than are illustrated in FIG. 1. The processor cores 131-133 execute instructions such as program code 125 stored in the memory 105 and the CPU 130 stores information in the memory 105 such as the results of the executed instructions. The CPU 130 is also able to initiate graphics processing by issuing draw calls or other tasks to the parallel processor 115.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the parallel processor 115, or the CPU 130. In the illustrated implementation, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the parallel processor 115 or the CPU 130.

In some implementations, due to hardware or software limitations, such as limited bit-widths of certain instruction fields, the compute units 121, 122, and 123 are unable to access all of the memories 124, 126, 128 associated with all of the compute units and/or the memory 105 using a single instruction. For example, in some implementations, the compute unit 121 can only access the memory 124 associated with the compute unit 121 due to a limitation of the circuitry of the compute unit 121 and/or parallel processor 115, which limits a number of bits that can be specified by the compute unit 121 to identify a memory address. As an example, in some implementations, a number of bits specifying an address in a particular memory is larger than a number of bits an instruction that can be executed by the compute unit 121 can directly specify. However, in some implementations, the compute unit 121 is operable to access additional memories, such as the memory 105 and memory 126 associated with the compute unit 122, by using a combination of instructions that allow for extended memory access. For example, in implementations where a single instruction is limited to eight address bits in a memory address field, an additional instruction is able to provide additional bits to specify addresses outside of the range of a single instruction.

By enabling the compute units 121, 122, and 123 to access memory addresses outside of the range of a single instruction's memory address field, the compute units 121, 122, and 123 are able to process more complicated threads or waves that may require more memory than is available in a memory, such as the memory 124, associated with a single compute unit, such as the compute unit 121. For example, in conventional implementations where an individual compute unit is only able to access memory associated with that individual compute unit, but a task desired to be run on that compute unit requires more memory than is available in that particular associated memory, one or more other compute units may need to be assigned substantially the same task with separate sets of data stored in each of the compute units' respective associated memories. In other conventional implementations, compute units could access memories associated with other compute units but only in an inefficient manner requiring a plurality of separate instructions and/or a relatively significant amount of latency in processing the instructions and/or accessing the memories. However, enabling the compute units 121, 122, 123 to utilize an additional instruction that executes efficiently to provide additional bits to specify addresses outside of the range of a single instruction, the shortcomings of conventional implementations are overcome.

In order to enable the additional instruction to execute efficiently, in some implementations, the parallel processor 115 and/or compute units 121, 122, or 123 concatenate a set of bits from a first instruction with a set of bits from a second instruction to specify an address in a memory that one of the compute units 121, 122, or 123 is unable to access using a single instruction. In this way, the compute unit 121 is able to access the memory 126 associated with the compute unit 122, for example, using first and second instructions, while the compute unit 122 is able to access memory 124 associated with the compute unit 121 using third and fourth instructions. In some implementations, as the two instructions specifying a location in memory provide upper and lower bit ranges of a memory address that the parallel processor 115 and/or one of the compute units 121, 122, or 123 then concatenate to specify the resulting, targeted memory address, the processor and/or compute unit is able to process the two instructions in a single processing cycle, requiring a minimum of additional latency and energy requirements compared to a single instruction. In some implementations, only a single processing cycle is required to process the instructions because a simple concatenation of bits specified in the instructions does not require a memory access or any other complex operations to be performed.

In some implementations, the parallel processor 115 and/or the compute units 121, 122, or 123 stores a first set of bits from a first instruction for concatenation with a set of bits associated with a second instruction and instructions subsequent to the second instruction. For example, in some implementations, a first instruction specifies an upper bit range of a memory address and, after that first instruction is executed, any subsequent instructions specifying memory addresses are treated as specifying a lower bit range of a memory address based on the upper bit range provided in the first instruction.

Figure 2:
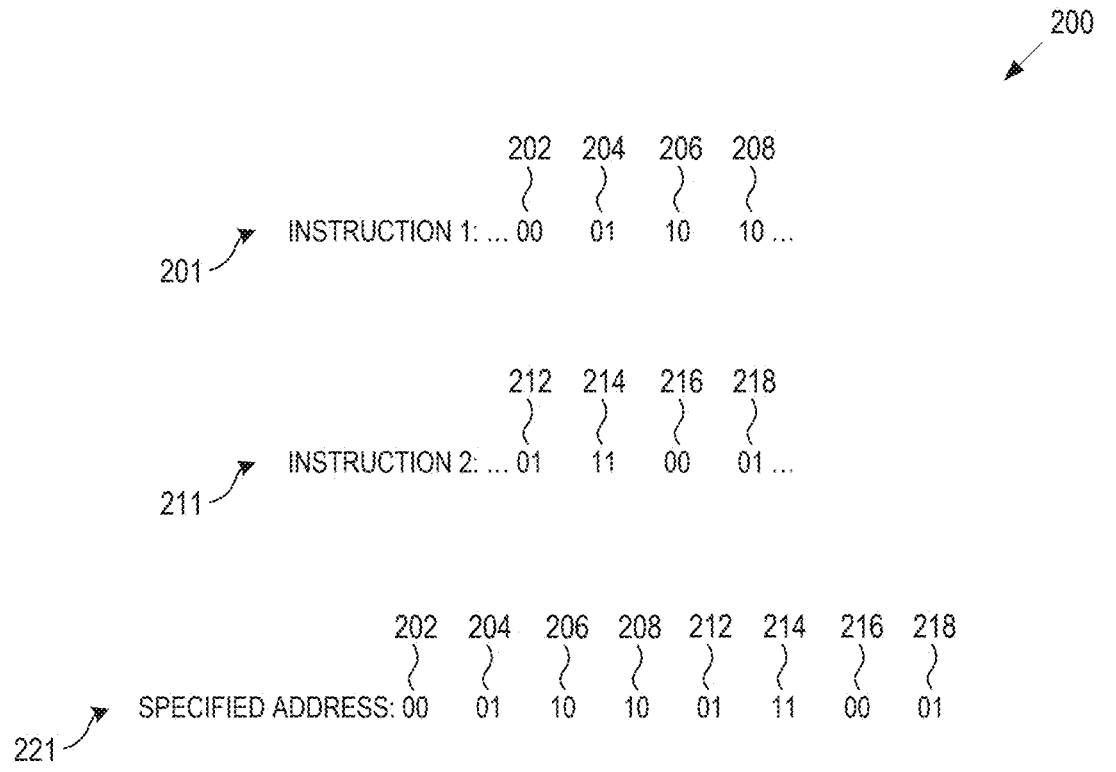
FIG. 2 is a diagram illustrating an example of extended memory access in a parallel processor according to some implementations.

FIG. 2 is a diagram illustrating an example 200 of extended memory access in a parallel processor according to some implementations. As shown in FIG. 2, a first instruction 201 specifies four pairs of bits, i.e., a first pair of bits 202, a second pair of bits 204, a third pair of bits 206, and a fourth pair of bits 208, while a second instruction 211 specifies four additional pairs of bits, i.e., a fifth pair of bits 212, a sixth pair of bits 214, a seventh pair of bits 216, and an eighth pair of bits 218. Although in this example eight bits are specified in each instruction, in some implementations, the number of specified bits varies between the two instructions, such that one instruction specifies more or fewer bits than the other instruction, and in some implementations one or more of the instructions specify more than eight bits for, e.g., a memory address field, such as sixteen bits, twenty-four bits, thirty-two bits, and so on.

When the first instruction 201 specifies an upper bit range, such as 00 01 10 10 in the example of FIG. 2, and the second instruction 211 specifies a lower bit range, such as 01 11 00 01 in the example of FIG. 2, the parallel processor 115 and/or the compute units 121, 122, or 123 interprets the second instruction 211 as specifying a memory address corresponding to the combination of the upper bits specified by the first instruction 201 and the lower bits specified by the second instruction 211. As shown in the example of FIG. 2, the specified memory address 221 resulting from the concatenation of the upper and lower bits is sixteen bits, i.e., 00 01 10 10 01 11 00 01. When a subsequent, e.g., third, instruction executes that specifies another group of lower bits, such as 00 00 00 00, in some implementations, the upper bits specified by the first instruction 201 are concatenated with the lower bits of the third instruction to specify a different memory address from that specified by the second instruction 211, i.e., 00 01 10 10 00 00 00 00. As noted above, in some implementations, the instructions specify more or fewer bits than the instructions 201, 211 such that a specified address produced by concatenating the specified values of the first and second instructions has more or fewer than sixteen bits, e.g., thirty-two bits, sixty-four bits, and so on. Additionally, in some implementations, multiple instructions specify various upper bits of a memory address such that three or more instructions specify values that are all concatenated to specify a memory address.

In some implementations, the first instruction 201 is only associated with immediately subsequent instructions such that if the first instruction 201 specifies upper bits of a memory address and the second instruction 211 specifies lower bits of the memory address, subsequent instructions, such as a third instruction, will not utilize the upper bits specified in the first instruction 201 and instead will revert to being limited to a smaller number of bits to specify a memory address, i.e., eight bits in the example of FIG. 2. In some implementations, the first instruction 201 specifying upper bits of a memory address includes a mode setting command that controls whether it will apply to only an immediately subsequent instruction, a specified number of subsequent instructions, or all subsequent instructions. In some implementations, a separate instruction terminates any mode setting of the first instruction 201 such that the upper bits specified by the first instruction 201 will no longer be concatenated with address bits of instructions subsequent to the termination instruction. Additionally, in some implementations, the second instruction 211 includes a mode setting command that controls whether it will utilize upper bits specified by one or more previous instructions to specify a concatenated memory address with bits specified in the second instruction 211.

In some implementations, the first instruction 201 specifies upper bits for a portion of a first address and a portion of a second address. For example, in some implementations, the first pair of bits 202 specifies upper bits for a first address, the second pair of bits 204 specifies upper bits for a second address, the third pair of bits 206 specifies upper bits for a third address, and the fourth pair of bits 208 specifies upper bits for a fourth address. When the second instruction 211 executes and specifies one or more memory address fields, e.g., as one or more of the fifth pair of bits 212, the sixth pair of bits 214, the seventh pair of bits 216, or the eighth pair of bits 218, the pairs of bits in the second instruction 211 will be piecewise concatenated with one or more of the pairs of bits of the first instruction 201 to specify a memory address. For example, in some implementations, the first pair of bits 202 in the first instruction 201 specify upper bits for an address for which the fifth pair of bits 212 of the second instruction 211 specify the lower bits. In the example of FIG. 2, the resulting address of the first pair of bits 202 (00) and the fifth pair of bits 212 (01) would be "00 01." Similarly, in the example of FIG. 2, when the second pair of bits 204 in the first instruction 201 specify upper bits for an address for which the sixth pair of bits 214 in the second instruction 211 specify the lower bits, the resulting address would be "01 11." In this way, in some implementations, a single instruction, such as the first instruction 201, can provide upper bits for a plurality of addresses in a subsequent instruction.

In some implementations, the first instruction 201 and/or the second instruction 211 include a mode setting command specifying which, if any, of its bits are to be used as upper or lower bits to be concatenated with upper or lower bits of another instruction. For example, in some implementations, the third bit pair 206 (10) in instruction 1 201 indicates that bit pair 204 is not to be used as upper bits for any subsequent instructions due to those bits being set to the value "10." In some implementations, a separate mode setting command or a separate instruction specifies which bits, if any, of a first instruction are to be concatenated with bits in subsequent instructions to specify memory addresses. It is noted that although examples herein describe a first instruction specifying upper bits for a memory address and subsequent instructions specifying lower bits for the address, where the upper bits are then concatenated with the lower bits, in some implementations, the first instruction specifies lower bits for a memory address and subsequent instructions specify upper bits for the address.

By enabling the compute units 121, 122, and 123 to utilize two instructions to access memory locations that cannot be directly specified using a single instruction, in some implementations, the compute units 121, 122, and 123 are able to access an entire address space, e.g., including the memories 124, 126, and 128 contained in the address space, where the compute units 121, 122, and 123 would otherwise only able to access a subset of that address space (e.g., only one or a subset of the memories 124, 126, and 128). For example, by concatenating upper bits from a first instruction with lower bits from a second instruction, each compute unit 121, 122, and 123 is able to access the entire address space. Notably, although the examples hereinabove refer to memory addresses, in some implementations, two instructions are used in substantially the same manner, with one or more specifying an upper bit range and another specifying a lower bit range, in some implementations having the same or different bit sizes per range, which are then concatenated to specify the desired value, to specify an immediate or literal constant value or any other type of value, e.g., for an operand. In some implementations, upper bits set by instructions are context save and restored during a context switch, and, in some implementations, compilers insert instructions as necessary to implement extended memory access during a particular compilation stage while, prior to that compilation stage, the compiler assumes full access to memory is available. In some implementations, compiler management of implementing extended memory access instructions enables programmers to be agnostic to but still benefit from the extended memory access functionality.

Figure 3:
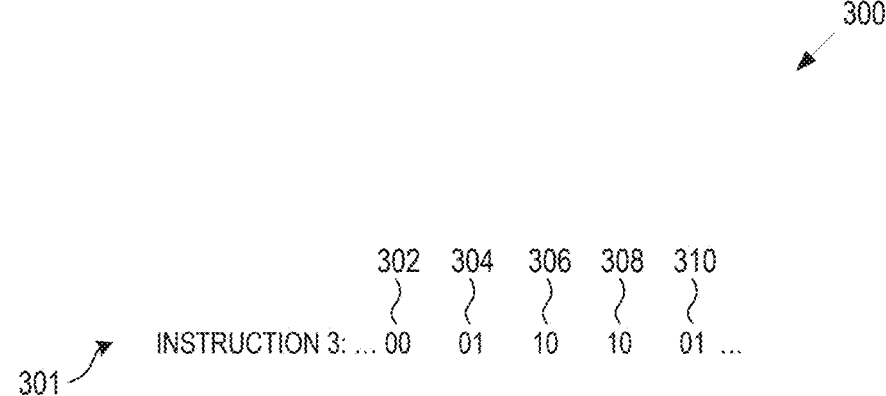
FIG. 3 is a diagram illustrating an example of using a mode-setting command for extended memory access in a parallel processor according to some implementations.

FIG. 3 is a diagram illustrating an example 300 of using a mode-setting command for extended memory access in a parallel processor according to some implementations. As shown in FIG. 3, similar to the first instruction 201 and the second instruction 211 of FIG. 2, a third instruction 301 specifies four pairs of bits, i.e., a first pair of bits 302, a second pair of bits 304, a third pair of bits 306, and a fourth pair of bits 308, but additionally provides a fifth pair of bits 310. Although in this example ten bits are specified in the third instruction 301, in some implementations, the number of specified bits varies, such that one instruction specifies more or fewer bits than another instruction, and in some implementations one or more of the instructions specify more than ten bits. In the example of FIG. 3, as with the first instruction 201 and the second instruction 211 of FIG. 2, the first four pairs of bits, i.e., bit pairs 302, 304, 306, and 308, specify an upper bit range, such as 00 01 10 10. However, in the example of FIG. 3, the fifth bit pair, i.e., bit pair 310, represents a mode-setting command or mode-setting bits that controls how subsequent instructions will be affected by the third instruction 301.

For example, in some implementations, the bit pair 310 indicates that only a subset of the first four pairs of bits, i.e., bit pairs 302, 304, 306, and 308, are to be used as upper or lower bits to be concatenated with upper or lower bits of another instruction. In some implementations, the value "01" of the fifth bit pair 310 indicates that the first two bit pairs 302 and 304 are to be ignored in subsequent instructions while the second two bit pairs 306 and 308 are to be used as upper or lower bits to be concatenated with upper or lower bits of another instruction. In some implementations, the value "01" of the fifth bit pair 310 indicates that the bit pairs 302, 304, 306, and 308 are to be used as upper or lower bits to be concatenated with upper or lower bits of another instruction only for an immediately subsequent instruction to the third instruction 301. In some implementations, more or fewer bits are used for a mode-setting command, and, in some implementations, a single mode-setting command specifies both whether an instruction will affect subsequent instructions, optionally a specific number of subsequent instructions, as well as how many bits in an associated instruction should affect subsequent instructions. For example, in some implementations, the value "01" of the fifth bit pair 310 indicates that all subsequent instructions should be affected by the instruction (through the "0" value of the fifth bit pair 310) and simultaneously indicates that all of the bit pairs 302, 304, 306, and 308 are to be used as upper or lower bits to be concatenated with upper or lower bits of all subsequent instructions (through the "1" value of the fifth bit pair 310).

Figure 4:
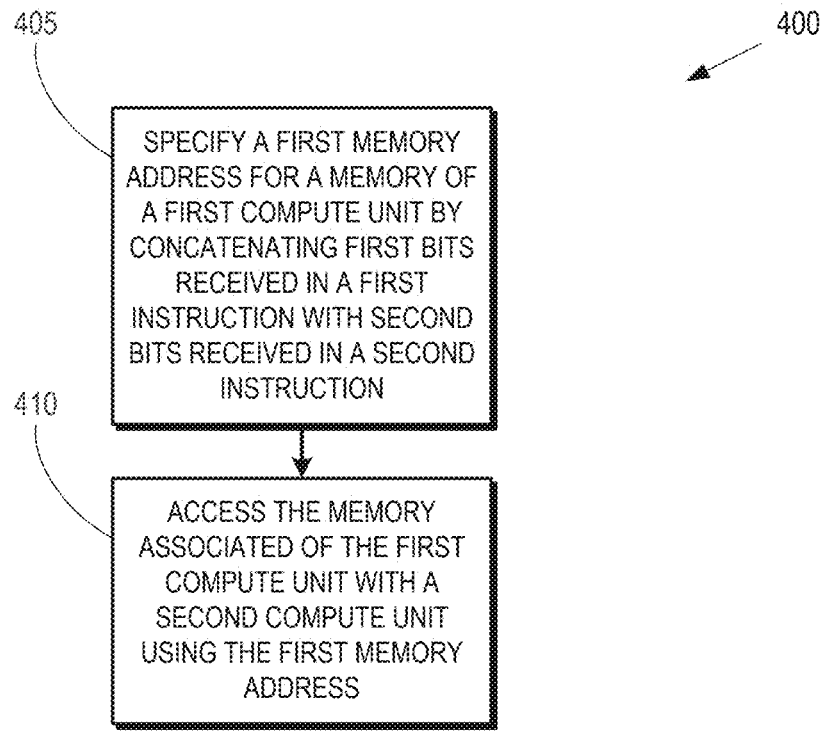
FIG. 4 is a flow diagram of a method of providing extended memory access in a parallel processor according to some implementations.

FIG. 4 is a flow diagram of a method 400 of providing extended memory access in a parallel processor, such as the parallel processor 115 of FIG. 1, according to some implementations. In some implementations, the method 400 is executed by one or more of the parallel processor 115, the scheduler 112, and the compute units 121, 122, and 123 of the processing system 100 of FIG. 1. At block 405 of the method 400, a first memory address for a memory associated with a first compute unit, such as the memory address 221 FIG. 2 for the memory 124 associated with the compute unit 121, is specified by concatenating a first set of bits received in a first instruction, such as the bits 202, 204, 206, and 208 of instruction 1 201 of FIG. 2, with a second set of bits received in a second instruction, such as the bits 212, 214, 216, and 218 of instruction 2 211 of FIG. 2. At block 410 of the method 400, a second compute unit, such as the compute unit 122, accesses the memory associated with the first compute unit using the first memory address.

In some implementations, as described hereinabove, the method 400 includes specifying a second memory address for a memory associated with the second compute unit by concatenating a third set of bits received in a third instruction with a fourth set of bits received in a fourth instruction and using the first compute unit to access the memory associated with the second compute unit using the second memory address. In some implementations, the method 400 includes storing the first set of bits for concatenation with a set of bits associated with an instruction subsequent to the second instruction. In some implementations, the method 400 includes storing the first set of bits for concatenation only with the second set of bits received in the second instruction. In some implementations, the first set of bits includes bits specifying a portion of a first address and bits specifying a portion of a second address. In some implementations, a number of bits specifying the first memory address is larger than a number of bits the second instruction can directly specify.

In some implementations, the apparatuses and techniques described above are implemented in a system including one or more integrated circuit (IC) devices (also referred to as integrated circuit packages or microchips), such as the parallel processor 115, the compute units 121, 122, and 123, the scheduler 112, the memories 124, 126, 128, and the method 400 described above with reference to FIGS. 1 and 4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

One or more of the elements described above is circuitry designed and configured to perform the corresponding operations described above. Such circuitry, in at least some implementations, is any one of, or a combination of, a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry," "engines," "workgroups," "launchers," "interfaces," "chiplets," etc.) are described or claimed as "configured" to perform one or more tasks or operations.

This formulation of "[entity] configured to [perform one or more tasks]" is used herein to refer to structure (e.g., a physical element, such as electronic circuitry, or an algorithm in software executed by such a physical element). More specifically, this formulation is used to indicate that this physical structure is arranged to perform the one or more tasks during operation. A structure can be said to be "configured to" perform some task even if the structure is not currently being operated. Thus, an entity described or recited as "configured to" perform some task refers to a physical element, such as a device, circuitry, memory storing program instructions executable to implement the task, or an algorithm executed using such a physical element. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. An apparatus comprising:
a processor comprising a first compute unit associated with a first memory and a second compute unit associated with a second memory, wherein the first compute unit is operable to access the second memory based on a first instruction specifying a first set of bits and a second instruction specifying a second set of bits, wherein the processor is configured to concatenate the first and second sets of bits to specify an address in the second memory.

2. The apparatus of claim 1, wherein the second compute unit is operable to access the first memory based on a third instruction specifying a third set of bits and a fourth instruction specifying a fourth set of bits, and wherein the processor is configured to concatenate the third and fourth sets of bits to specify an address in the first memory.

3. The apparatus of claim 1, wherein the processor is configured to store the first set of bits for concatenation with a set of bits associated with an instruction subsequent to the second instruction.

4. The apparatus of claim 1, wherein the processor is configured to store the first set of bits for concatenation only with the second set of bits specified by the second instruction.

5. The apparatus of claim 1, wherein the first set of bits includes bits specifying a portion of a first address and bits specifying a portion of a second address.

6. The apparatus of claim 1, wherein a number of bits specifying the address in the second memory is larger than a number of bits the second instruction can directly specify.

7. The apparatus of claim 1, wherein the processor is configured to process the first instruction and the second instruction in a single processing cycle.

8. A system comprising:
a processor comprising a plurality of compute units, each of the compute units having an associated memory, wherein the associated memories are contained in an address space,
wherein each compute unit is operable to access the entire address space based on the processor concatenating a first set of bits specified by a first instruction and a second set of bits specified by a second instruction.

9. The system of claim 8, wherein the processor is configured to store the first set of bits for concatenation with a set of bits associated with an instruction subsequent to the second instruction.

10. The system of claim 8, wherein the processor is configured to store the first set of bits for concatenation only with the second set of bits specified by the second instruction.

11. The system of claim 8, wherein the first set of bits includes bits specifying a portion of a first address and bits specifying a portion of a second address.

12. The system of claim 8, wherein a number of bits specifying an address in the address space is larger than a number of bits the second instruction can directly specify.

13. The system of claim 8, wherein the processor is configured to process the first instruction and the second instruction in a single processing cycle.

14. A method of providing extended memory access, comprising:
specifying a first memory address for a memory associated with a first compute unit by concatenating a first set of bits received in a first instruction with a second set of bits received in a second instruction; and
using a second compute unit to access the memory associated with the first compute unit using the first memory address.

15. The method of claim 14, further comprising:
specifying a second memory address for a memory associated with the second compute unit by concatenating a third set of bits received in a third instruction with a fourth set of bits received in a fourth instruction; and
using the first compute unit to access the memory associated with the second compute unit using the second memory address.

16. The method of claim 14, further comprising storing the first set of bits for concatenation with a set of bits associated with an instruction subsequent to the second instruction.

17. The method of claim 14, further comprising storing the first set of bits for concatenation only with the second set of bits received in the second instruction.

18. The method of claim 14, wherein the first set of bits includes bits specifying a portion of a first address and bits specifying a portion of a second address.

19. The method of claim 14, wherein a number of bits specifying the first memory address is larger than a number of bits the second instruction can directly specify.

* * * * *